Oct. 7, 1941.                S. DE ORLOW                2,258,065
                           HINGE STRUCTURE
                         Filed Nov. 22, 1937
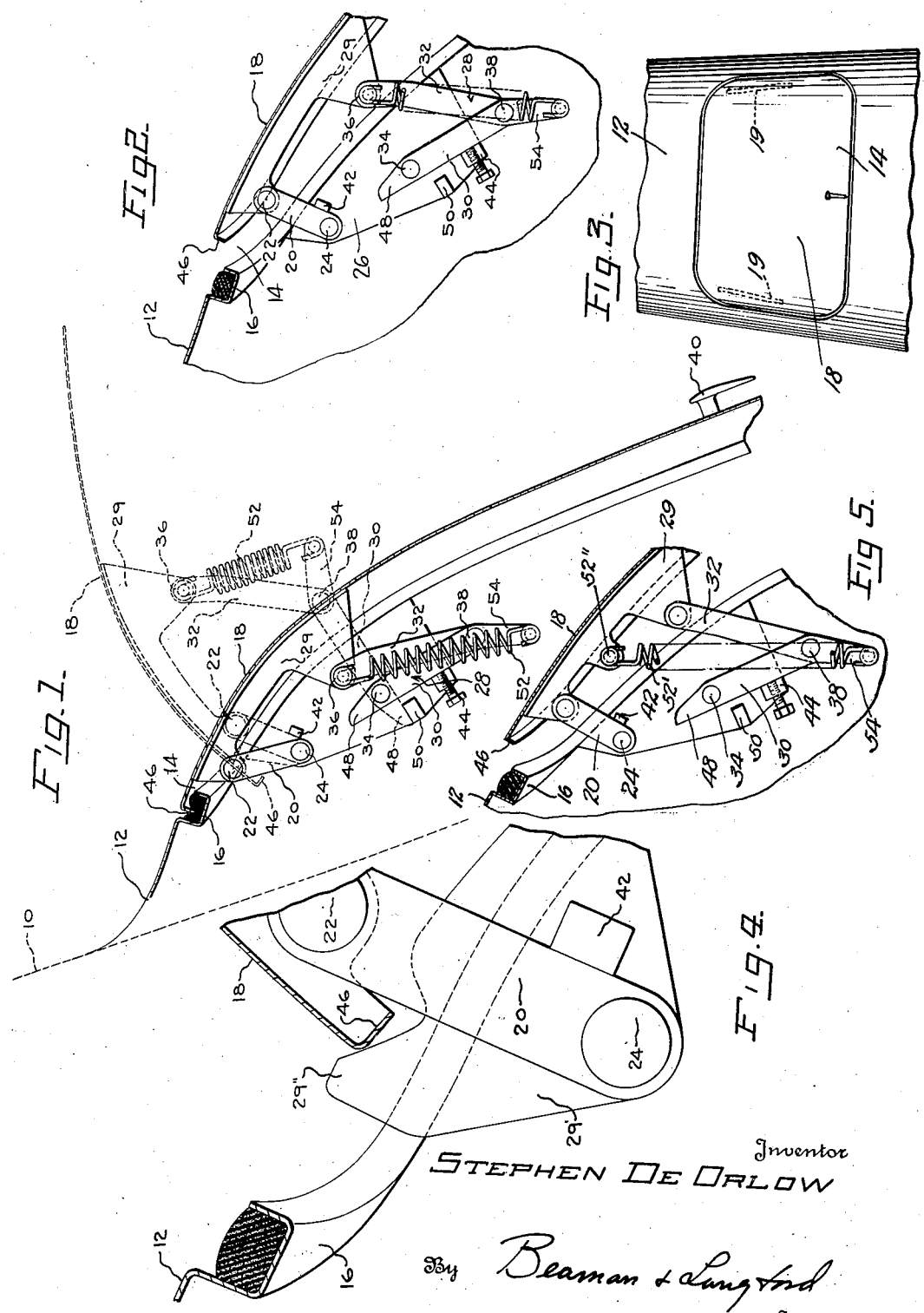
Inventor
STEPHEN DE ORLOW
By Beaman & Langford
Attorneys Patented Oct. 7, 1941

2,258,065

UNITED STATES PATENT OFFICE 2,258,065

HINGE STRUCTURE

Stephen De Orlow, Detroit, Mich.

Application November 22, 1937, Serial No. 175,767

3 Claims. (Cl. 16—163)

The present invention relates to improvements in hinge structures for swinging structure, such as the hoods and compartment covers for automobiles, as well as windows, hatches, and the covers and lids of compartments in general. Hinge structures of the type hereinafter disclosed are particularly useful in connection with the hinged covers of automobiles and the like which are a part of the body and are usually of complex contour, as for example, the hood for the engine and the cover for the usual rear compartment.

An object of the invention is to provide a novel hinge structure of the type permitting the hinged part to have other than pivotal or swinging movement about a fixed axis.

Another object is to provide a hinge structure permitting bodily movement of the hinged part in addition to a pivotal or swinging movement, the same being simple in its construction and operation.

A further object resides in a hinge structure as aforesaid in which a novel arrangement is provided for counterbalancing, urging, and/or supporting the hinged part into open position.

Other objects of the invention reside in the combination and arrangement of parts for providing the desired compound movement characterizing the hinge structure.

In the drawing, wherein several embodiments are illustrated,

Fig. 1 is a cross-sectional view showing one form of the hinge structure used in connection with the rear cover of an automobile compartment, Fig. 2 is a view similar to Fig. 1 showing one stage of movement of the hinged cover part, Fig. 3 is a fragmentary elevational view of the rear end of an automobile showing the relation of the hinge structure to the cover, Fig. 4 is a cross-sectional fragmentary view of a detail of construction, and Fig. 5 is a view of the hinge structure as seen in Fig. 2 with a modified spring arrangement.

In the drawing three different forms of the invention have been illustrated in connection with the cover or closure for the built in compartment at the rear of an automobile. While the principles of operation of my improved hinges are particularly adaptable to such constructions, the disclosure of the invention in connection with automobile closures is merely illustrative and is not to be taken as limiting the scope of the invention and its contemplated field of usefulness.

Referring to Figs. 1, 2 and 3 of the drawing, the dotted line 10 indicates the rear of an automobile having a compartment 12 to which access is afforded through an opening 14 defined by a channel 16 into which a closure or cover 18 is fitted. The hinge 19 for guiding the cover 18 to its closed position shown in full line and for positioning and supporting it in open position, as shown in dotted line, comprises a link 20, having pivotal connections 22 and 24 with the cover 18 and the base plate 26 affixed to the wall of the compartment 12, and an extensible and contractible linkage 28 of two members 30 and 32. The linkage 28 has pivotal connections 36 and 34 with the plate 29 on the cover 18 and the base plate 26 while the members 30 and 32 have a pivotal connection at 38. As shown in Fig. 3, a pair of hinges 19 are usually located at opposite sides of the cover 18. This is the preferred arrangement, however, a single hinge may be found practical in many constructions. Moreover, it is not necessary that the link 20 and linkage 28 be adjacently associated as it may be often desirable because of the hinge supporting structure to laterally space the link 20 and linkage 28 along the general line of hinging action.

In operation, the cover 18 is raised through the handle 40. An outward and upward lift upon the handle 40 will cause the cover 18 to be bodily elevated and shifted from the full line position of Fig. 1 to the position shown in Fig. 2. During this movement the link 20 has swung clockwise to engage the stop 42 and the member 32 has similar movement about its pivotal connection 38; the member 30 having remained in engagement with its stop 44. It is to be noted that with the cover 18 closed, as shown in Fig. 1, the link 20 is to the left of the vertical so as to lift the turned edge 46 out of the channel 16 upon clockwise swinging movement. In Fig. 2, the link 20 is to the right of the vertical with the weight of the cover 18 acting to urge the same against the stop 20. This is desirable for upon continued lifting of the cover 18, the pivotal connection 22 assumes the position of Fig. 2 while the cover 18 pivots about the same in the manner of the conventional hinge. As the cover 18 pivots about 22, the two-member linkage 28 is extended to the point of engagement of the tail 48 with the stop 50.

Aside from its function of assisting in defining the path of movement of the cover 18, the two-member linkage 28 has the additional function of serving as a prop. This function is preferably carried out in conjunction with a coil spring 52 anchored at one end to the cover 18 as at the pivotal connection 36 and at the opposite end to the tail 54 of the member 30. When the cover 18 is closed the spring 52 is extended with its line of action preferably to one side of the pivotal connection 38 so as to urge and hold the cover 18 into its closed position. As the cover 18 is lifted by the handle 40, the spring 52 is permitted to shorten straightening out the linkage 28 until the stop 50 is engaged by the tail 48. It might be stated at this point that the stop 44 preferably takes the form of an adjustable screw as illustrated so as to assure the firm seating of the cover 18 in the groove 16 at the upper edge of the cover 18. It should be apparent from a consideration of Fig. 1 that manipulation of the stop 44 moving the arm 30 counter-clockwise will have the effect of forcing the upper edge of the cover 18 to the channel 16. With the properly selected spring it should be apparent that the linkage 28 will function to support the cover in the dotted line position of Fig. 1. The advantages connected with actual shifting the cover 18 bodily toward the operator and then swing the narrowed top of the cover 18 virtually into the opening 14 should be readily appreciated. In full open position the handle 40 is more accessible, particularly to persons of small stature. This is particularly true when the operation of my hinge is compared with the so-called "goose neck" hinge which has been used to a considerable extent in connection with rear decks and covers of built in trunks of automobiles.

A careful consideration of the construction of Figs. 1 and 2 will make it apparent that by deliberate or strained action upon the part of the operator the cover 18 may be raised to its full open position without the link 20, for example, being in engagement with the stop 42 or the member 30 remaining in contact with the stop 44 until the link 20 engages the stop 42. The normal operation, however, will be as above described.

In Fig. 4, the construction of Figs. 1 and 2 is shown in connection with a bracket 29' having a projecting ear 29''. After the cover 18 is shifted to the position shown in Fig. 2, pivotal movement about 22 will dispose the upper edge of the cover 18 behind the ear 29''. The ear 29'' now functions as a stop preventing counter-clockwise movement of the arm 20 with the cover 18 in a raised position. However, upon lowering the cover 18 from its raised position to the position shown in Fig. 2, the cover 18 will clear the ear 29'' permitting the cover 18 to be bodily swung into the closed position through the swinging movement of the link 20 and linkage 28. It will be understood from the foregoing, that the ear 29'' functions to control the compound pivotal and bodily swinging movements of the cover 18.

A slight change in spring arrangement is illustrated in Fig. 5 as compared with that shown in Fig. 2. The spring 52' is shown connected at its upper end at 52'' more adjacent the pivotal connection 22 than in the case of the spring 52, of Fig. 2. Through this arrangement the spring 52' has an evener effect upon the bodily movement of the cover 18, upon clockwise swinging movement of the links 20 and 32; the spring 52' functioning to hold the link 20 firmly against the stop 42 during the pivotal movement of the cover 18 about 22. In other words, the spring 52' has been so positioned as to predetermine and control the compound pivotal and swinging action of the cover 18.

Each of the illustrated forms of the invention may be considered concealed hinge structure. In automobile body design it is the usual practice to have the closure or cover flush with the body contour as shown in Fig. 1. It will be appreciated that the hinge action of the present invention is well adapted for swinging the cover into and out of the recess in which it is disposed when closed. I also wish it to be understood that my hinge structure is equally desirable with flat covers as with curvilinear. Moreover, where the cover is not narrowed at the top so as to be capable of being tilted into the opening as shown in dotted line position in Fig. 1, it is only necessary to select the proper length for the link 20 and the location of the pivotal connection 22 so that the upper edge or that edge adjacent the hinging line will entirely clear the opening defining structure.

In the foregoing description, the extensible and collapsible links which serve as props for the cover have in some cases been described as consisting of a plurality of link members. For example, in Figs. 1 and 2 the extensible and collapsible linkage 28 has been defined as comprising links 30 and 32. In the appended claims the term extensible and collapsible link or link of variable overall dimension is intended to cover all constructions of such characteristics regardless of whether they comprise one or more of what might be termed link members or the equivalent. I wish to claim broadly a hinge structure comprising a swinging link of fixed dimension and a link of variable dimension which may take numerous forms and shapes within the scope of the present invention as will be well understood by those skilled in the art.

Having described my invention, what I claim and desire to protect by Letters Patent is:

1. A hinge structure comprising a one-piece link adapted to have pivotal connections at its opposite ends with a hinge part and a relatively fixed part, a stop for limiting the swinging movement of said link around its pivotal connection with said fixed part, a two-piece hinged link having a pivotal connection with said parts, a stop for limiting the swinging movement of that part of said two-piece link having pivotal connections with said fixed part, upon initial opening movement of said hinged part said one-piece link swinging about its pivotal connection with said fixed part into engagement with said first stop, with the other part of said two-piece link swinging about its pivotal connection with said first part of said two-piece link with said first part in engagement with said second stop, said hinged part upon continued opening movement swinging about its pivotal connection with said one-piece link, and resilient means associated with said two piece link for urging the same into an extended position.

2. A hinge and prop structure for pivotally supporting a hinged part from a fixed part, comprising means constituting a carriage for defining the bodily movement of said hinged part, a stop for limiting the movement of said carriage in one direction, one element of said means including an extensible and collapsible prop, and resilient means associated with said prop for extending the same for urging said carriage against said stop.

3. A hinge and prop structure for a hinged part supported from a fixed part, comprising link means constituting a carriage for defining the bodily movement of said hinged part, a stop for limiting the movement of one link element of said carriage, said link means including an extensible and collapsible prop, and resilient means associated with said prop for extending the same to urge said one link element of said carriage against said stop.

STEPHEN DE ORLOW.